United States Patent
Chauvin et al.

(10) Patent No.: US 8,473,524 B2
(45) Date of Patent: Jun. 25, 2013

(54) METHOD AND SYSTEM FOR UPDATING OBJECT DATA WITH RESPECT TO OBJECT SPECIFICATIONS IN A PRODUCT LIFE CYCLE MANAGEMENT SYSTEM

(75) Inventors: Frédéric Guy Joseph Chauvin, Villepreux (FR); Michaél Eric François Diguet, Meudon (FR)

(73) Assignee: Dassault Systemes, Velizy-Villacoublay (FR)

( * ) Notice: Subject to any disclaimer, the term of this patent is extended or adjusted under 35 U.S.C. 154(b) by 424 days.

(21) Appl. No.: 12/431,277

(22) Filed: Apr. 28, 2009

(65) Prior Publication Data

US 2010/0274818 A1   Oct. 28, 2010

(51) Int. Cl.
*G06F 7/00* (2006.01)
(52) U.S. Cl.
USPC ......................................... 707/798
(58) Field of Classification Search
USPC ................... 707/716, 726, 797, 798
See application file for complete search history.

(56) References Cited

U.S. PATENT DOCUMENTS

| | | | |
|---|---|---|---|
| 6,629,065 B1 | 9/2003 | Gadh et al. | |
| 6,898,560 B1 | 5/2005 | Das | |
| 2006/0122721 A1* | 6/2006 | Ouchi | 700/105 |
| 2006/0294459 A1* | 12/2006 | Davis et al. | 715/513 |
| 2007/0018986 A1* | 1/2007 | Hauser | 345/440 |
| 2008/0033785 A1 | 2/2008 | Anke | |
| 2008/0114753 A1* | 5/2008 | Tal-Ezer | 707/5 |
| 2008/0222114 A1* | 9/2008 | Schreiber | 707/3 |
| 2010/0153152 A1* | 6/2010 | Kind | 705/7 |

OTHER PUBLICATIONS

Dong et al., "Maintaining Transitive Closure of Graphs in SQL," *International Journal of Information Technology*, pp. 1-29 (1999).

* cited by examiner

*Primary Examiner* — Amy Ng
(74) *Attorney, Agent, or Firm* — Hamilton, Brook, Smith & Reynolds, P.C.

(57) ABSTRACT

The invention is directed to a Product Lifecycle Management (PLM) update process for updating objects with respect to specifications. The process invokes dependence relations between objects. It relies on building a directed graph, wherein objects are the nodes of the graph. An arc (also called "edge") is directed from a second object to a first object, the latter depending on the second object according to dependence relations of the PLM system. Thus, the update can be carried by browsing the graph along the direction of the arcs in the graph. Owing to the reversion of the graph with respect to the dependence of objects, the simple solution of the invention guarantees that the update of an object occurs only when the ancestor object it depends on is up to date, and so on. This drastically reduces failures at update in practice.

20 Claims, 14 Drawing Sheets

| Object pertaining to a ... | Importance for user | Description of the object |
|---|---|---|
| Representation Reference | High | A data container (3DShape is an example of Representation Reference that contains geometry). |
| Representation Instance | Low | An instance of a Representation Reference. |
| Product Reference | High | A product reference. |
| Product Instance | Low | An instance of a product reference, owning a position. |
| Position of Product Instance or Product Occurrence | Low | An object that represents the position of a product instance of occurrence. |
| Relation | Normal | The relation between e.g. two CATIA objects. |
| Publication | Normal | An object that publishes something in a Representation Reference (parameter, geometry, ...) |
| Engineering Connection | High | A connector between objects often used to position these objects together (e.g. thanks to geometrical constraints). |
| Network of Engineering Connections | High | An object that represents a network of Engineering Connections which have to be solved together. |
| Contextual link of contextual Engineering Connection | Normal | An object allowing the storage of the context of a contextual Engineering Connection. |
| Parameter | Low | A parameter (length, real, volume, ...) |
| Formula | Normal | A formula expressing a relation between some parameters. |
| Drawing | High | Drafting Object. |
| Sheet | Normal | Drafting Object. |
| View | Normal | Drafting Object. |
| Symmetry Connection | Normal | Object used to store specification of a symmetric product. |
| Simulation Object | High | Object used to store specification of a simulation. |
| ... | ... | ... |

FIG. 13

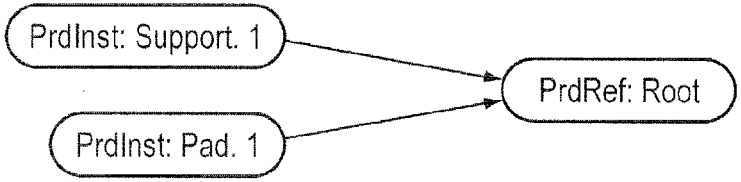
FIG. 16A
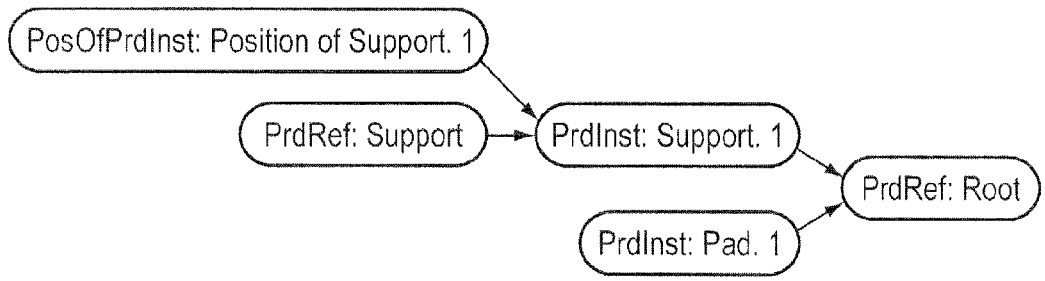
FIG. 16B
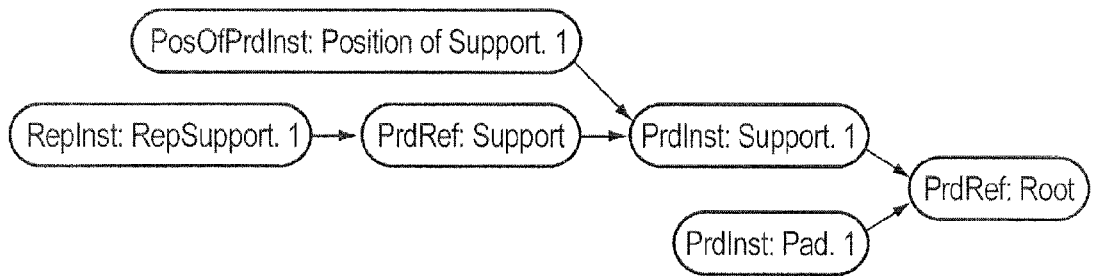
FIG. 16C
FIG. 16D

METHOD AND SYSTEM FOR UPDATING OBJECT DATA WITH RESPECT TO OBJECT SPECIFICATIONS IN A PRODUCT LIFE CYCLE MANAGEMENT SYSTEM

FIELD OF THE INVENTION

The invention relates to the field of Product Lifecycle Management (PLM) solutions.

BACKGROUND

Product Lifecycle Management (PLM) solutions refer to a business strategy that helps companies to share product data, apply common processes, and leverage corporate knowledge for the development of products from conception to the end of their life, across the concept of extended enterprise. By including the actors (company departments, business partners, suppliers, Original Equipment Manufacturers (OEM), and customers), PLM may allow this network to operate as a single entity to conceptualize, design, build, and support products and processes.

Amongst the PLM solutions are the computer-aided techniques, which are known to include Computer-Aided Design (CAD). Computer-Aided Design relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing processes and operations. Some PLM solutions make it possible, for instance, to design and develop products by creating digital mockups (a 3D graphical model of a product). The digital product may first be defined and simulated using an appropriate application. Then, the lean digital manufacturing processes may be defined and modeled.

A number of systems and programs are offered on the market for the design of objects (or parts) or assemblies of objects, forming a product, such as the one provided by Dassault Systemes under the trademark CATIA. These CAD systems allow a user to construct and manipulate complex three dimensional (3D) models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are mostly specifications of geometry. Specifically, CAD files contain specifications, from which geometry is generated, which in turn allow for a representation to be generated. Geometry and representation may be stored in a single CAD file or multiple ones. CAD systems include graphic tools for representing the modeled objects to the designers; these tools are dedicated to the display of complex objects—the typical size of a file representing an object in a CAD system being in the range of one Megabyte per part, and an assembly may comprise thousands of parts. A CAD system manages models of objects, which are stored in electronic files. The graphical user interface (GUI) plays an important role as regards the efficiency of the technique.

More generally, the PLM solutions provided by Dassault Systemes (under the trademarks CATIA, ENOVIA and DELMIA) provides an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Such PLM solutions comprise a relational database of products. The database comprises a set of textual data and relations between the data. Data typically include technical data related to the products, said data being ordered in a hierarchy of data and are being indexed to be searchable. The data are representative of the modeled objects, which are often modeled products and processes.

PLM information, including product configuration, process knowledge and resources information, are typically intended to be edited in a collaborative way.

Amongst other features, modeling in CAD applications often requires defining not only the geometric objects, but also the functional dependences between the said objects. This is achieved, for instance, with the help of constraints. A constraint (e.g. a geometric constraint) is a relation among geometric objects that should be satisfied. For example, one may require that a first object is located at a given distance (offset) from a second object.

More generally, other types of relations may occur, such as specifications. For example, specifications may relate to interference specifications, which encompass clash, contact and clearance specifications. Other types of specifications are possible as well.

In the PLM world, data update is a constant problem, specifically as the set of objects to update are interrelated. By update, it is here meant updating object data with respect to object specifications. In some case, the amount of data that come into play is so important that it might be impossible to load all data in memory to update them. Moreover, updating data is still complicated when users work in a collaborative way.

There is accordingly a need to provide a tool to update PLM objects. Some tools already exist in the market. Usually, the update is an algorithm that, starting from a set of specifications and from a state that is not consistent with the specifications (or 'out of date'), produces a result consistent with these specifications ('up to date').

Basically, owing to the number of parts/products involved (see the discussion above as to CAD), a problem is that the PLM update of the known solutions very often fails in practice. Thus, there is a need for an improved and robust process, allowing for updating object data with respect to object specifications in a product life cycle management system. Ideally, what is needed is an update solution "that does not fail".

SUMMARY

Embodiments provide a method of updating object data with respect to object specifications in a product life cycle management system comprising objects, dependence relations between objects and object specifications, the method comprising:

building a directed graph comprising nodes and arcs, wherein:
 a node of the graph represents an object of the system; and
 an arc of the graph is directed from a second object to a first object, the first object depending on the second object according to a dependence relation; and updating object data of identified objects based on object specifications of the system by browsing the graph according to a direction of the directed arcs of the graph.

The method according to an embodiment may comprise one or more of the following features:

building the directed graph comprises:
identifying a first object of the system to be updated;
identifying a relation pointing from said first object to a second object; and
identifying the second object;
and the step of building the directed graph further comprises storing in a graph structure definition the identified first object and second as respective nodes of the graph, and storing the relation as an arc directed from the second object to the first object;
building the directed graph further comprises, after identifying the second object:
identifying a relation pointing from said second object to a third object; and
identifying the third object;
and the step of building the directed graph further comprises storing in the graph structure definition the identified third object as a respective node of the graph, and storing the relation pointing to the third object as an arc directed from the third object to the second object;
a dependence relation pointing from a first object to a second object of the system implies a direct dependence of the first object on the second object;
the method further comprises steps of identifying a cycle in the graph; and aggregating nodes in the identified cycle, if any, as a single complex node, and substituting the nodes in the identified cycle with the complex node;
the method further comprises steps of ranking nodes in the graph according to a importance criterion, whereby of importance for the user; and aggregating nodes of dissimilar importance according to a proximity criterion;
the method further comprises a step of identifying in the graph a redundant arc, directly linking two objects which are further indirectly linked by two or more other arcs of the graph; and removing the identified redundant arc;
a dependence relation comprises information as to whether an object pointed by said relation is in session or not;
the step of updating object data of identified objects further comprises ranking nodes of the graph along directions of arcs in the graph, such that the rank of a node is an increment of the largest rank of ancestries of the node in the graph;
the step of updating object data of identified objects further comprises re-ranking globally all the nodes of the graph, for example according to a "leaves first" or a "bottom-up" criterion;
the step of updating object data of identified objects further comprises browsing the graph and updating each node in the browsing direction;
a step of displaying nodes and arcs of the graph in a Graphical User Interface, prior to and/or during the step of updating object data;
the step of displaying nodes and arcs further comprises displaying a status of nodes of the graph according to a status of update thereof, the status being based on said object data;
the objects of the system comprise one or more of the following objects: an object of position of a product instance or a product reference, a relation, a network of engineering connections;
the dependence relations comprise data as to whether a pointed object is in a current working session or not.

An embodiment is also directed to a computer program comprising program code means for carrying out the process of the present invention.

An embodiment also provides computerized system comprising program code means for carrying out the process of the present invention.

An embodiment still concerns a graphical user interface for updating object data with respect to object specifications in a product life cycle management system comprising objects, dependence relations between objects and object specifications, the graphical user interface being designed to communicate with the PLM system so as to display:
a directed graph comprising nodes and arcs, wherein:
a node of the graph represents an object of the system; and
an arc of the graph is directed from a second object to a first object, the first object depending on the second object according to a dependence relation; and
a status of update of object data of identified objects, the update based on object specifications of the system and obtained by browsing the graph and updating each node according to a direction of directed arcs of the graph.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments of the present invention.

FIG. 13 is a table aggregating objects likely to be involved in an update process according to an embodiment of the invention.

FIG. 14: parts are out of date. FIG. 15: parts are up to date (result to be achieved from FIG. 14).

FIGS. 16A-16J exemplify a step-by-step construction of a raw graph according to an embodiment of the invention.

DETAILED DESCRIPTION

A description of example embodiments follows.

In simple words, embodiments are directed to a PLM update process for updating objects with respect to specifications. The process invokes dependence relations between objects. It relies on building a directed graph, wherein objects are the nodes of the graph. An arc (sometimes also called 'edge') is directed from a second object to a first object, the latter depending on the second object according to dependence relations of the PLM system. Thus, the update can be carried by browsing the graph along the direction of the arcs in the graph. Owing to the reversion of the graph with respect to the dependence of objects, the simple solution in an embodiment guarantees that the update of an object occurs only when the ancestor object it depends on is up to date, and so on. This drastically reduces failures in practice.

Figure 1:
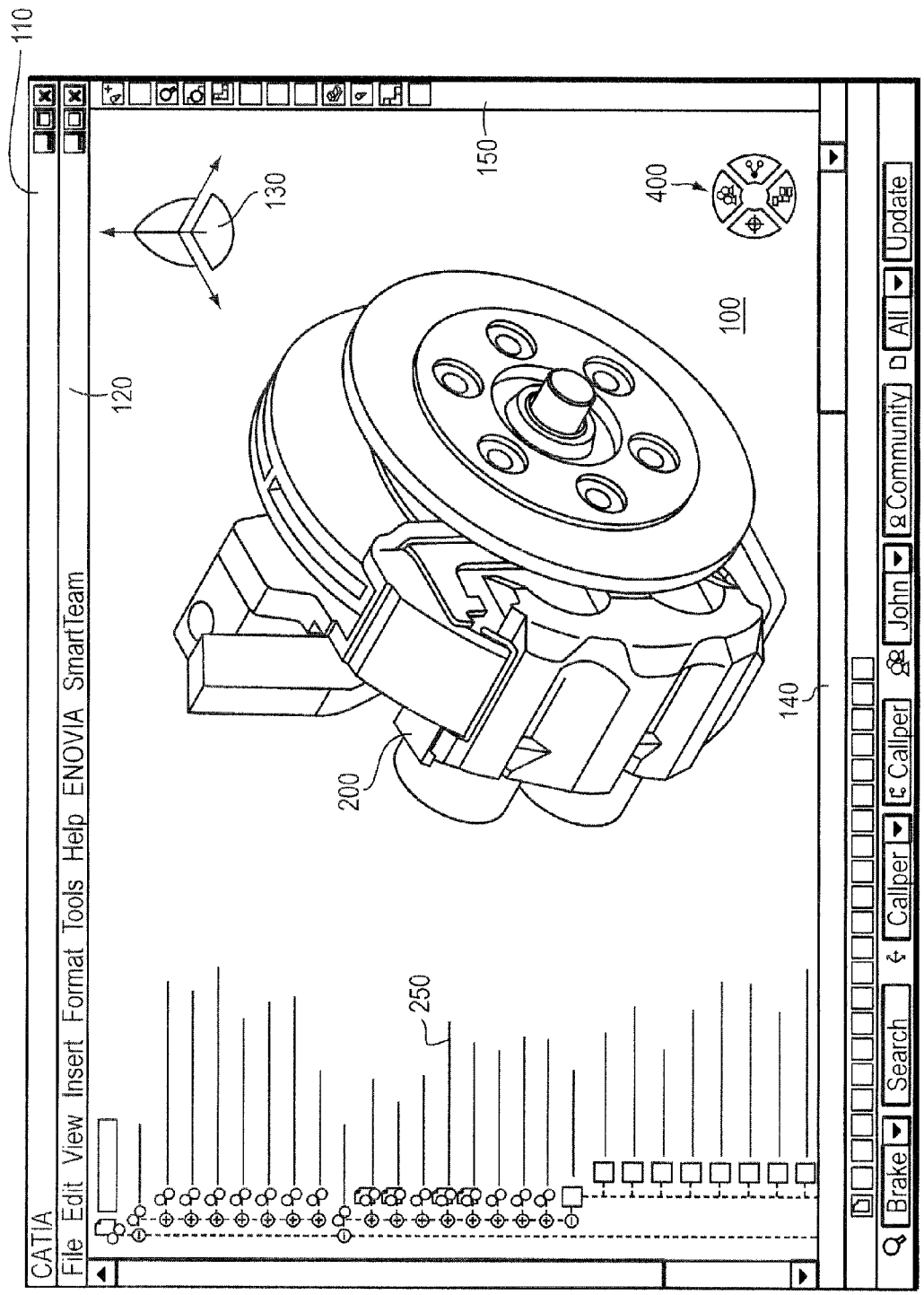
FIG. 1 is a depiction of a graphical interface suited for carrying out steps of a method according to an embodiment of the invention.

In reference to FIG. 1: in practice, several users are provided with a graphical user interface (or GUI) such as the one of CATIA. The users in question work in a collaborative way on various parts.

The exemplified GUI 100 may be a typical CAD-like interface, having standard menu bars 110, 120, as well as bottom and side toolbars 140, 150. Such menu- and toolbars contain a set of user-selectable icons, each icon being associated with one or more operations or functions, as known in the art.

Some of these icons are associated with software tools, adapted for editing and/or working on a modeled product 200 or parts of product 200 such as that displayed in the GUI 100. In the following description, "product," "part," "assembly" and the like may be referred to as "part" for the sake of simplicity. Note that the concept of "part" can in fact be generalized to that of "object", wherein an object can be only a "physical" part of the designed product or, more generally, any software tool participating in the design process (but not necessarily "in" the final product).

The software tools may be grouped into workbenches, each workbench comprising a subset of software tools. In particular, one of the workbenches is an edition workbench, suitable for editing geometrical features of the modeled product 200. In operation, a designer may for example pre-select a part of the object 200 and then initiate an operation (e.g. change the dimension, color, etc.) or edit geometrical constraints by selecting an appropriate icon. For example, typical CAD operations are the modeling of the punching or the folding of a 3D modeled object displayed on the screen.

The GUI may, for example, display data 250 related to the displayed product 200. In the example of FIG. 1, the data 250, displayed as a "feature tree", and their 3D representation 200 pertain to a brake assembly including brake caliper and disc. The GUI may further show various types of graphic tool 130, 160, for example for facilitating 3D orientation of the object, for triggering a simulation of an operation of an edited product or render various attributes of the displayed product 200.

The GUI is, for instance, adapted for allowing access to a PLM database, either on user request or as a background task, in contrast with usual CAD/CAM interfaces. Thus, in operation, a user who wishes to access the database does not have to pass from a first CAD window to a PDM window (for example by minimizing the first window and maximizing the second window), adapted for querying the database, and then go back to the CAD/CAM window. Such window switching operations, frequently carried out by designers, are time consuming and particularly inappropriate in the field of CAD/CAM.

For instance, GUIs similar to that identified by reference numeral 100 displayed in FIG. 1 may be run on other computers of the network. These computers may further benefit from similar local applications and a common environment.

As an example embodiment of the process, the process is implemented in a computer network comprising user computers and one or more product data management (PDM) system. The user computers are in communication with the PDM system. The PDM system may, for example, be located at a backbone of the network. The PDM system allows for the management of numerous documents, relations and data, possibly hierarchically interrelated. Such a PDM system is equipped with a PLM database having data related to modeled products, assemblies and product parts, which are likely to be edited by a designer.

A plurality of users may thus work in a collaborative way on different parts/products/assemblies. This is likely to give rise to conflicts, not only while editing parts/products but also when updating them, as outlined in the introduction.

Embodiments substantially mitigate the risk of failures when updating PLM objects, and specifically objects edited in a collaborative way. To this aim, the process relies on a smart use of dependence between objects.

Figure 2:
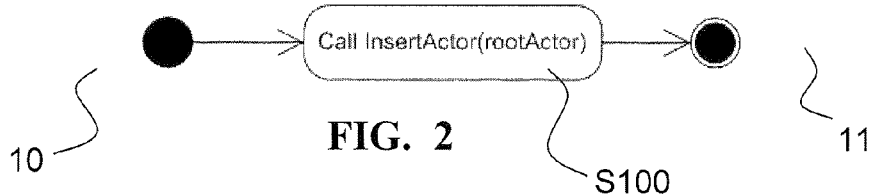
FIGS. 2 and 3 are flowcharts reflecting an embodiment of the invention.

FIG. 2 shows an exemplary high level algorithm to build such a graph. The format used in FIG. 2 relies on UML specifications, known to a person of ordinary skill in the art. In this embodiment, the raw graph construction algorithm ("BuildRawGraph") uses a root actor in input 10 (hence the name "RootActor," this is a PLM object, e.g., a CATIA object. It calls at step S100 a main procedure to insert other actors ("InsertActor") and returns a raw graph in output 11. Note that in the following, we shall consider that a PLM object involved in the procedures depicted in FIG. 2 or FIG. 3 (discussed below) is an actor. Yet, an actor merely refers to a PLM object (which is an example of CATIA object) stored in the system.

As mentioned earlier, the directed graph built according to an embodiment is such that actors (or objects) are at the nodes of the graph. An arc points to a first object that depends on a second object, whereby the direction of arcs is reversed compared to dependence relations. Note that the dependence relations do usually not exist; it might thus be necessary to create them beforehand. The update process next browses the graph along arcs thereof. Thus, updating an object occurs when its direct ancestor is up-to-date, which is itself updated when its own direct ancestor is up to date. Accordingly, failures at update are substantially reduced. Note that updating an object per se is known per se.

Figure 3:
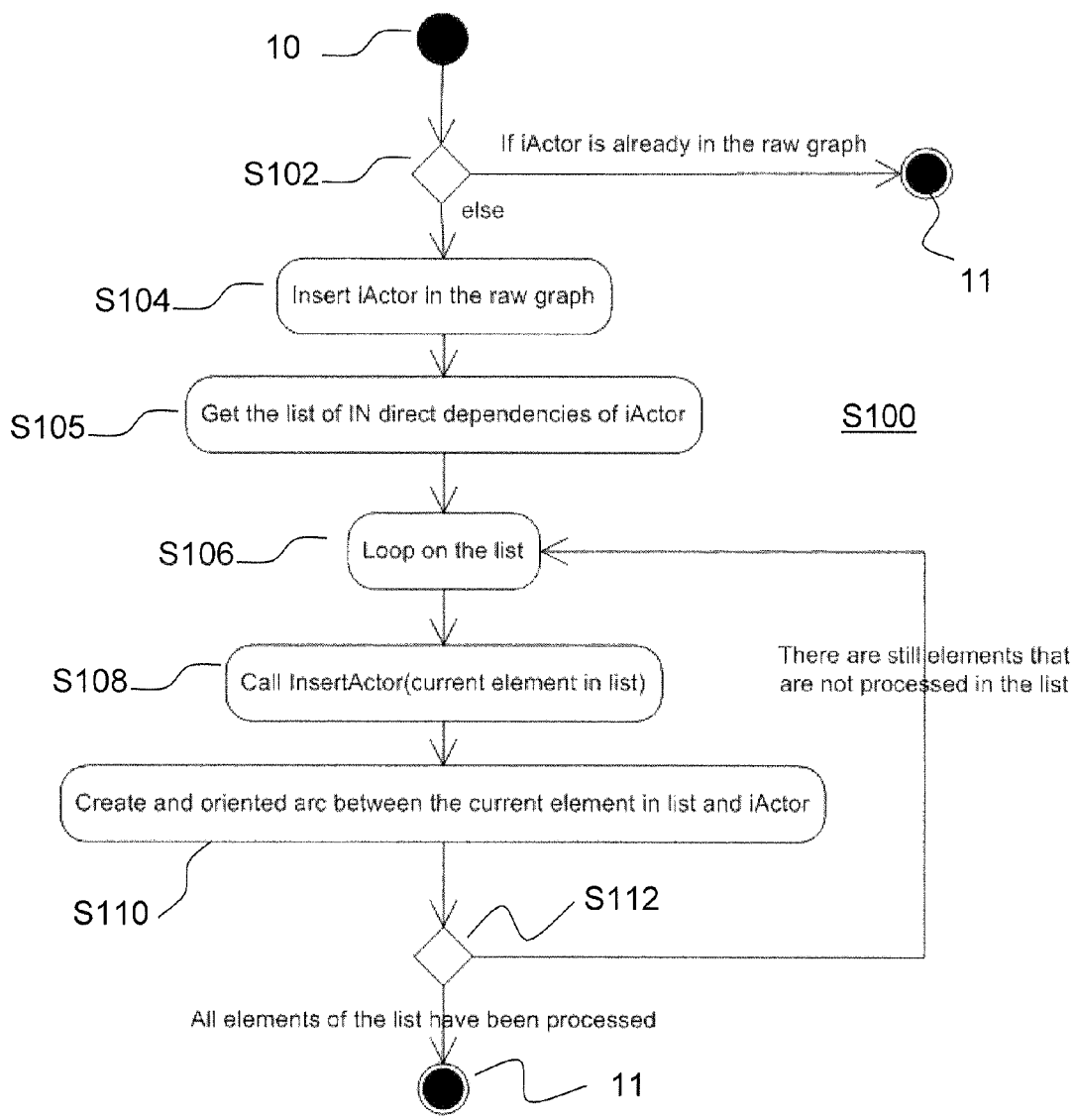

FIG. 3 is a flow diagram showing a detailed procedure to insert objects from a root actor. Actually, FIG. 3 depicts the step S100 of FIG. 2. Preferably, the process is recursive. First, the process may test at step 102 whether the current actor is already 'in' the graph, that is, whether it was already processed or not. If yes, the procedure ends, and an output 11 is produced.

Otherwise, the current actor ('iActor') is inserted at step 104 and thereby identified as a node in the graph.

Next, a step 105, a relation pointing from the current actor to a second actor is identified. The relation represents a dependence of the current actor on the second actor. Such a relation may be part of the numerous objects present in the PLM system.

The step of identifying dependence relations may be contemplated as a step at which an actor declares its dependence—or IN dependences, that is, its dependences on other objects. Thus, one understands that additional control can be implemented at this step, by allowing objects to be (e.g. at least partially) in command of its declaration.

Dependencies of the current actor can thus be identified (S105). Following this (steps S105-S106-S108-S102-S104), at least a second actor is identified. When the procedure is recursive, it likely calls itself at S108, which likely identifies another object, hence steps S102-S104 are likely "repeated" in the recursive process.

At this point, the identified current and second objects are stored in a graph structure definition as respective nodes of the graph. The identified relation is stored (S110). Yet, as emphasized above, it is stored as an arc directed from the second object to the first object, contrary to the "direction" of the dependence (which one intuitively perceives as oriented from the current object to a second object).

In a very simple case, the graph can contain only one node. In another very simple case, the graph hence contains two nodes, pertaining to a first actor and a second actor. The first actor depends on the second actor to be updated.

Owing to the direction of the single arc involved up to now, updating nodes of the graph starts with the second actor. Once updated, the first actor may safely be updated, since the second actor does not depend on the first actor.

As long as elements remain to be inserted, the flow may loop on the list of second actors identified at step S106. Therefore, the flow may identify another dependence relation, that is, a second-order relation, pointing from the second object already identified to a third object, and so on.

Consistently with the above process, the second relation identified is in turn stored (S110) as an arc directed from the third object to the second object, in the graph structure definition. The third object identified is inserted as a third node in the graph.

The graph now contains three nodes, pertaining to a first, second and a third actor. The first actor depends on the second actor, which depends on the third actor. Owing to the directions of the two arcs in the graph, the update starts with the third actor. After the third actor is updated, the second actor can safely be updated, and so the first actor.

Finally, all actors (i.e. PLM objects, e.g., CATIA objects) involved in the update process are the nodes of the graph. Dependencies between objects are reflected by the arcs of the graph. The raw graph obtained is a translation of dependencies between objects in the form of a directed graph but according to a reverse direction with respect to initial dependence relations.

The process above is described in a relatively simple and pedagogical manner. The skilled person may, however, appreciate variants in the scope of embodiments, specifically as to algorithmic considerations.

For example, the first object identified can declare several dependence relations (this is likely the case in practice). Merely one dependence relation was described for the sake of convenience. Yet, when several relations are identified, the algorithm loops of the list of objects pointed to by the dependence relations from the first object, and so on.

In addition, the dependency between two objects does not necessarily correspond to a relation such as a "CATIA relation". For example, if an object such as a product aggregates another object (for example, a representation), the product may depend on the representation. This point will be discussed later.

In an embodiment, a step of reduction (discussed below) removes indirect dependencies between actors. In this regard, the construction of the raw graph can advantageously make use of existing dependence relations between objects, such as relations involved in the known concept of "relational view." Here, each object (called PLM object) can have relations to other objects (pointed objects). These relations generally have a synchronization status, which allows knowledge as to whether the pointing object took into account the changes of the pointed object (synchronized status) or not (unsynchronized status). Thus, in some embodiments, objects pointed to by IN dependence relations can be declared as IN dependencies in terms of PLM Update.

In addition, such relations can further inform whether pointed-to objects are "in session" or not. Therefore, this property allows for carrying out an update wherein update status outputs are reliable and consistent, even in a partial session.

In the simple examples described above, the situation contemplated is that of objects having merely one dependence relation on another object. Yet, PLM is often more involved, such that a raw graph produced according to the process described above may contain cycles.

Figure 4:
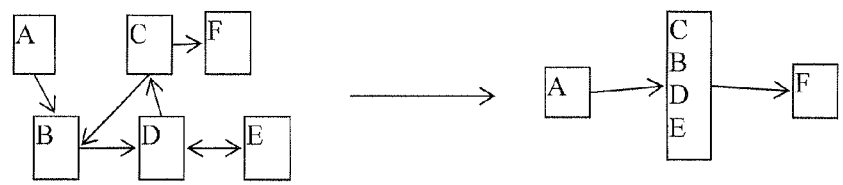
FIGS. 4-12 exemplify a step-by-step construction of a graph according to embodiments of the invention.

Therefore, the process in an embodiment may further comprise steps of identifying a cycle, aggregating nodes in the identified cycle, if any, as a single complex node, and substituting the nodes in the identified cycle with the complex node. This additional feature is schematically represented in FIG. 4. The raw graph in the left contains a cycle formed by objects C, B, D, and E. According to the additional steps above, objects C, B, D, and E can be aggregated as a single complex node, giving rise to the transformed graph in the right. Thus, all nodes in a cycle may be brought together. A directed tree results (i.e. directed acyclic graph), which is called a complex node tree. Suitable algorithms to achieve this are known in the art.

Figure 5:
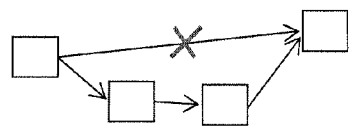

Next, as described above, a dependence relation is preferably representative of a direct dependence between actors. Yet, this does not prevent from arriving at a graph as depicted in FIG. 5, wherein an arc is redundant, that is, said redundant arc directly links two objects that are otherwise indirectly linked by two or more other arcs of the graph. Thus, an embodiment advantageously identifies such redundant arcs and removes them, as schematically represented in FIG. 5, wherein the crossed arc is to be removed. An algorithm to achieve this is here called a transitive reduction algorithm.

Now, not much has been said as to the possibility of interpretation of the graph by a user. However, it remains that a complex node graph can be difficult to interpret, without further refinements, owing to the number of objects likely involved.

In this respect, the graph obtained so far does not take into account the subjective importance of nodes for a user. Since some of the objects are naturally more important than others, a smart algorithm could suitably reduce the size of the graph to be eventually displayed to a user. To achieve this, one may design clusters that are the union of a complex node of high importance with other complex nodes of less importance.

Basically, the algorithm may accordingly first rank the complex nodes according to criteria of importance to the user and then aggregate unimportant nodes to important ones according to their proximity. Making use of a physical picture, it can be realized that the importance of a node is somehow comparable to the charge of a particle, the situation being that of:

important nodes "repelling" each other on one hand (like protons with a positive charge); and unimportant nodes repelling each other, too (like electrons having a negative charge);

Meanwhile, nodes of dissimilar importance (e.g. electrons and protons) attract each others. Thus, the solution to this N-body problem may rely on minimizing the "energy" of the interacting nodes. The aggregation process ends up with clusters comprising both unimportant and important nodes, such that a cluster is somehow comparable to a neutral atom (like that formed by an electron and a proton).

Note that preferably, objects with low importance and/or without update requirements may be completely hidden to the user after being integrated into one node cluster.

In brief:

after cycle removal, it is possible to obtain a graph without redundant arcs (depending on the raw graph);

the cycle removal algorithm can normally not generate new redundant arcs;

yet, the inventors have realized that the algorithm of aggregation (to make the graph user-readable) can generate some new redundant arcs.

Therefore, the transitive reduction algorithm (to remove redundant arcs) is preferably called just after cycle removal, and, most preferably, is called again after the algorithm of aggregation, in order to improve readability of the graph by a user.

Figure 6:
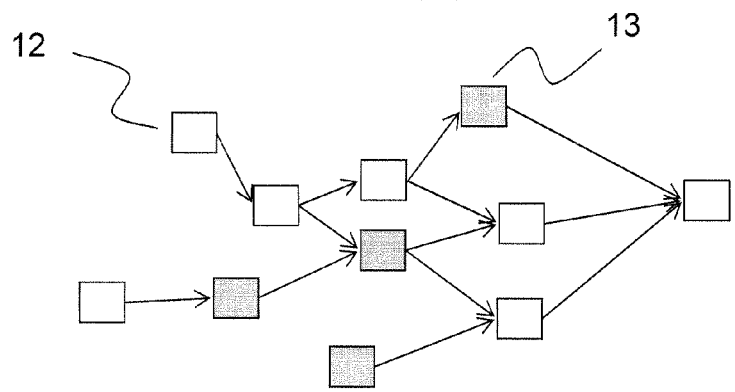
Figure 7:
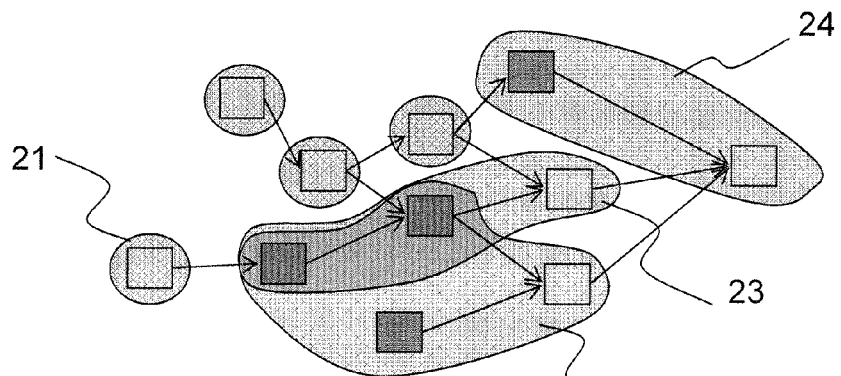

The above situation is illustrated in FIGS. 6 and 7. In FIG. 6, complex nodes 13 with less importance are in depicted in gray, while those with high importance 12 are white.

Figure 8:
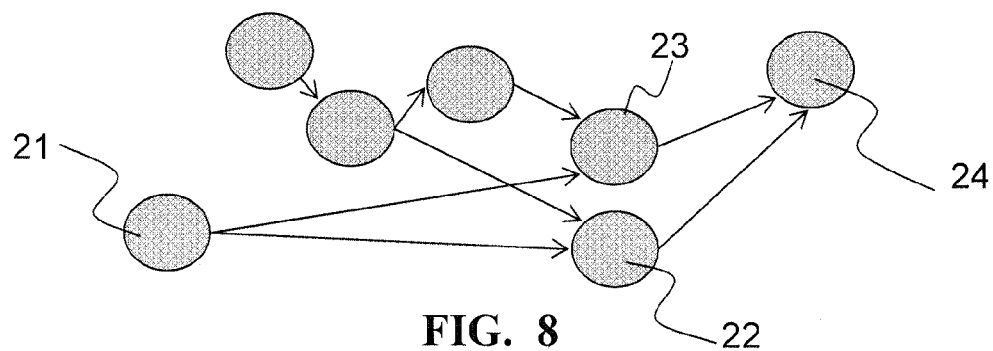

After the steps of clusterization (to both remove cycles and providing a graph user-readable) described above, the situation is that schematically represented in FIG. 7. Clusters 21, 22, 23, 24 are drawn as assemblies of the previous nodes. Next, a clusters 21, 22, 23, 24 become respective new nodes per se of the graph, that is, a new node for the subsequent update sequence, as depicted in FIG. 8. Note that even if clusters may partially overlap (as in FIG. 7), they are considered as independent nodes in the update sequence to ensure a suitable ordering in the update sequence.

In FIG. 8 numeral references of the new nodes corresponds to clusters as in FIG. 7.

Figure 9:
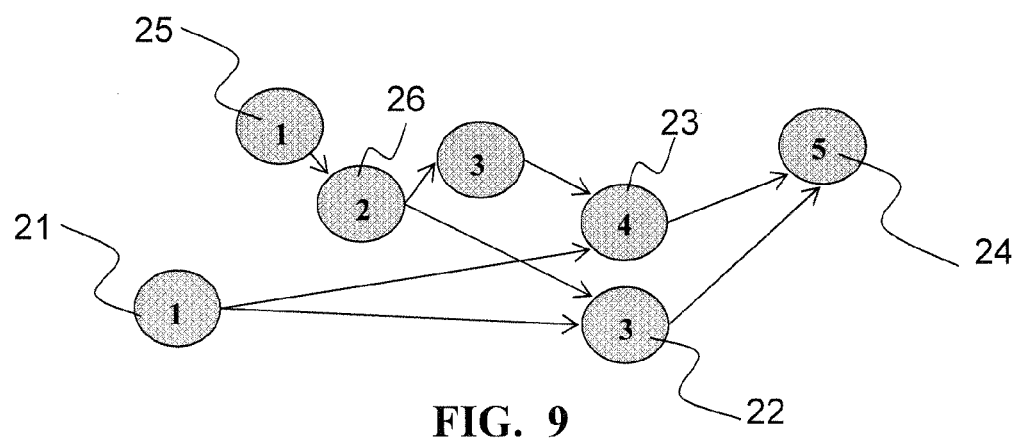

Next, as illustrated in FIG. 9, the new nodes are ranked along directions defined by arcs in the graph.

Preferably, nodes are ranked such that the rank of a given node is an increment of the largest rank of ancestries of the cluster in the graph. In practice, for each cluster, a rank can be computed according to the following rule:

the rank of a cluster with no ancestry (e.g., a direct input cluster) is 1; and the rank of a cluster having one or more ancestries is the largest rank of ancestries+1. For example, cluster 21 can be ranked on top of a list, since it has no ancestry, just as cluster 25 (numbers inside a node denote ranks in FIG. 9). Cluster 26 can come in second position, as it has only one ancestry. However, since cluster 22 has two ancestries with one on second position in a respective list, it cannot be given a rank less than 3, and so on.

For the sake of clarity of a subsequent display to the user, a suitable algorithm may be implemented in order to rework the arrangement of nodes as in FIG. 9. Accordingly, nodes are ordered according to an order type, e.g., asked by the update process client, which may draw a linear view of the update graph. One may therefore arrive at, e.g., the display of FIG. 10.

Figure 10:
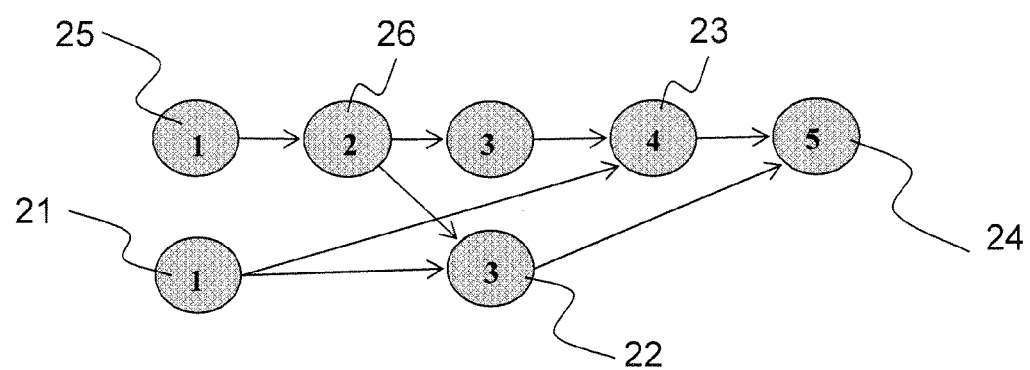
Figure 11:
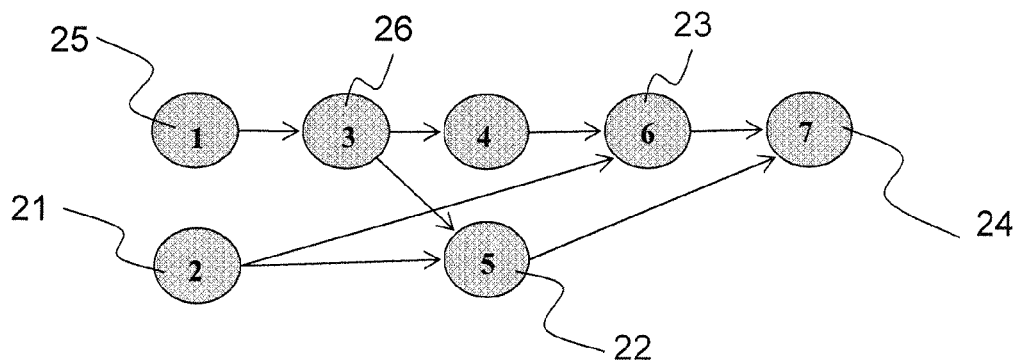
Figure 12:
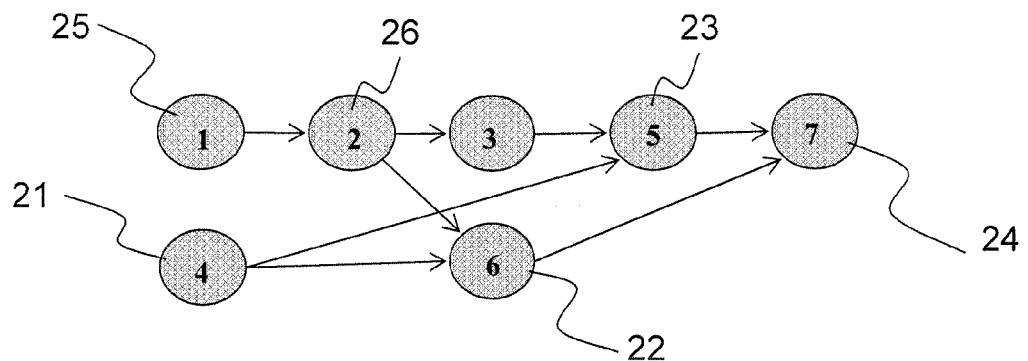

However, independently of the form of the graph, one obtains a ranking list that can be used for the update sequence. However, there are some situations where more than one input is possible, just as illustrated in FIG. 9 or FIG. 10. Thus, it might be advantageous (though not mandatory) to re-rank globally nodes in the graph, for example according to a "leaves first" or a "bottom-up" criterion, as known per se. FIGS. 11 and 12 represent respective graphs resulting from such re-ranking steps.

Two order types can, for instance, be used: "Leaves first" and "Bottom-up".

In the "Leaves first" order type (FIG. 11): the vertical direction is privileged. The clusters are ordered according to their "rank." In this mode, clusters of rank 1 are updated first (with an arbitrary order), then clusters of rank 2, etc. Accordingly, cluster 26 changes from rank 2 to rank 3 when passing from FIG. 10 to FIG. 11, and so on.

In the "Bottom-up" order type (FIG. 12): the horizontal direction is privileged. The ordering can be done with, e.g., a push-pull-based algorithm, known per se. Accordingly, cluster 21 changes from rank 1 in FIG. 10 to rank 4 in FIG. 12, and so on. Since horizontal direction is privileged with respect to vertical direction, cluster 21 changes from rank 3 in FIG. 10 to 4 in FIG. 12 (note that it had rank 5 in FIG. 11, owing to a principle of vertical first in FIG. 11).

The process can update object data of objects identified as nodes in the graph, by browsing the graph according to a direction of the directed arcs of the graph. As said before, update of an object is known per se.

Note that here, the process may go deeper in a given complex node to locally update, if necessary, nodes comprised in the complex node.

Now, more will be said as to the objects possibly involved in the PLM update. The table in FIG. 13 aggregates some of these objects. Objects in the PLM system may comprise one or more of the following objects: a representation reference, a representation instance, a product reference, a product instance, a position of product instance, a product occurrence, a PLM relation, a publication, an engineering connection, a network of engineering connections, a contextual link of contextual engineering connection, a parameter, a formula, a drawing, a sheet, a view, a symmetry connection, or a simulation object.

In particular, the PLM update may be extended to the position of a product instance or product occurrence, a dependence relation, or a network of engineering connections, in contrast with the usual objects considered for PLM update. Such objects are in bold face in the table of FIG. 13. In fact, the robustness of the present algorithm can afford inserting conceptually original objects in addition to the usual ones, which in turn help in improving the robustness of the algorithm when implemented, etc.

As outlined in FIG. 13, an object of product instance position or a product occurrence is an object that represents the position of a product instance or the occurrence itself of the product instance. Note in passing that the relative importance of such an object is a priori "low" for the user, so that it will likely be aggregated in a complex node of larger importance. Yet, it remains such taking into account such an object may help in defining the global dependencies.

A PLM relation (likely of intermediate importance to the user) is a relation between, e.g., two CATIA objects.

Also, an object related to a network of engineering connections (which, a priori, is of high importance) pertains to a network of connectors between objects, which are themselves often used to position objects together (e.g., thanks to geometrical constraints). The network of connectors may advantageously be solved together, hence a dedicated object in the update process.

Noteworthy, it should be kept in mind that some embodiments, which allow for building an update graph, facilitate the integration of different objects with a simple and effective process. Indeed, every object must simply declare its "IN" dependencies. In other words, dependence relations are identified and the arcs of the graph determined accordingly, as discussed above.

Figure 14:
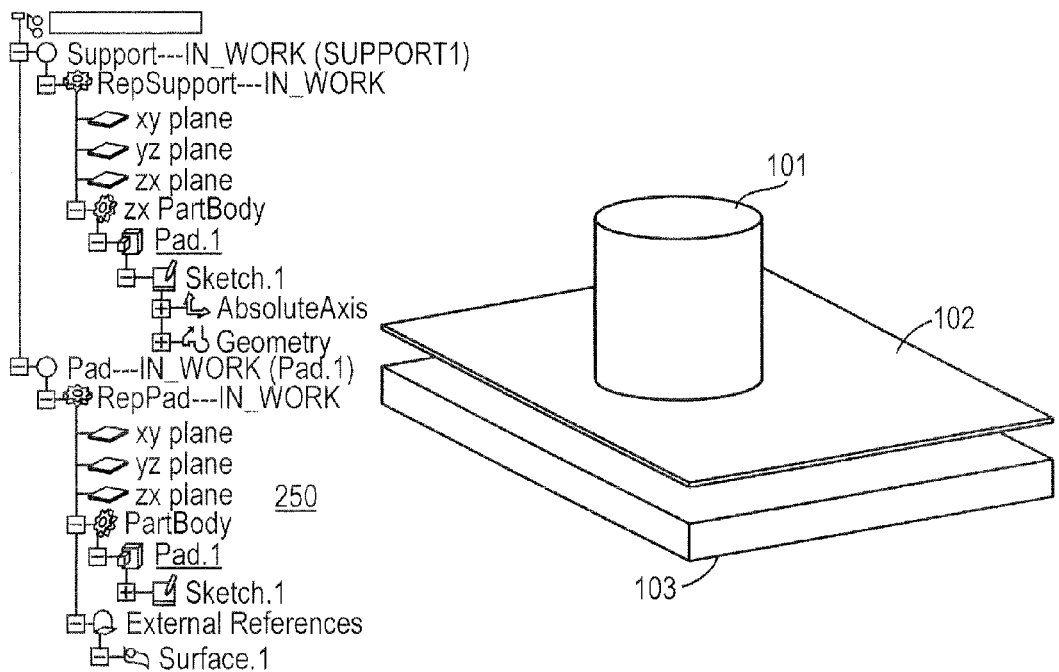
FIGS. 14-15 relate to a simple example of interrelated parts of a product to be updated.

The screenshot in FIG. 14 represents a simple assembly, displayed in a GUI 100, such as the one discussed in reference to FIG. 1. Here, one pad ("RepPad") 101 on top is intended to be constructed on another pad ("RepSupport") 103.

Here, the assembly is out of date, i.e. the result display in FIG. 14 is not consistent with user specifications. In fact, we consider here that the user has previously specified the support 103 be an extruded ellipse and that the cylindrical pad 101 is extruded from a sketch on the upper face of the support.

Figure 15:
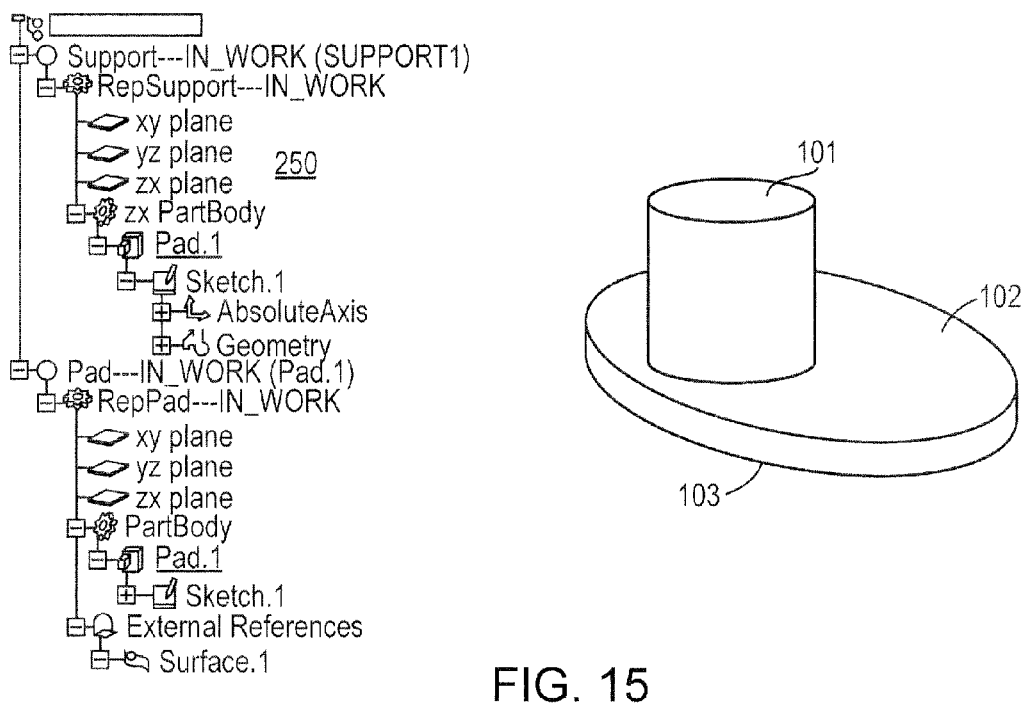

For a better understanding, we might look at the scheme of FIG. 15 that shows the result sought after update.

In addition, there is shown a relation between RepPad 101 and RepSupport 103. Such a relation does usually not appear in the product structure 250 and is thus represented here by a curved arrow. This relation links the external reference surface (the surface 102) with the upper face of the support 103, under the external reference surface 102.

Here, the relation is not synchronized, i.e. the external reference surface 102, which is a local copy of the upper face of the support 103, does not correspond with the real upper face.

This simple case demonstrates clearly that a usual product structure can sometimes not suffice to ensure a determination of a smart update sequence. Indeed, the relation in question is not shown in the product structure (usually not designed to this aim) and therefore not accounted for as such in an update sequence. Therefore, a PLM Update graph is advantageously built, which takes into account objects such as the relation in question.

To summarize in FIG. 14:

The support geometry 103 is out of date;

The relation is not synchronized (the local copy of the surface 102 does not correspond to the upper face of the pad); and The pad 101 is locally up to date.

In the following (in reference to FIGS. 16A-16J), the graph construction algorithm of an embodiment is applied on the simple example above. FIGS. 16A-16J make use of acronyms known to CATIA designer: PrdRef stands for product reference, PrdInst stands for product instance, PosOfPrdInst stands for position of product instance, RepInst stands for representation instance, RepRef stands for representation reference.

The process as described in reference to FIGS. 2 and 3 starts at the root (the one on top of the product structure 250 in FIG. 14 or 15). The raw graph construction algorithm ("BuildRawGraph") uses the root actor in input and calls a procedure to insert other actors, preferably recursively.

Since the root actor (PrdRef: Root) was not yet processed, it is retained 'in' the graph, FIG. 16A, that is, inserted as a node in the graph (the sole node until now).

Next, relations pointing from the root to second actors are identified, which represent a dependence of the root on second actors, which are in turn identified, FIG. 16B. Note that an identified relation is stored and represented as an arc directed from second actors to the root actors in FIG. 16B.

The process goes on recursively, whereby the support declares its own dependencies, which appear in FIG. 16C, i.e. the position of the support and the reference of the support instance at stake until now. Note that instances need numeral references for identification, in contrast with references, hence the 'PrdInst: Pad.1', 'PrdInst: Support.1' or 'PosOfPrdInst: Position ofSupport.1'.

Next, the support reference (PrdRef: Support in FIG. 16C) declares a dependence relation on an instance of representation of the support (RepInst: RepSupport.1), FIG. 16D, which in turn calls the corresponding reference, FIG. 16E. The graph grows accordingly.

Figure 16E:
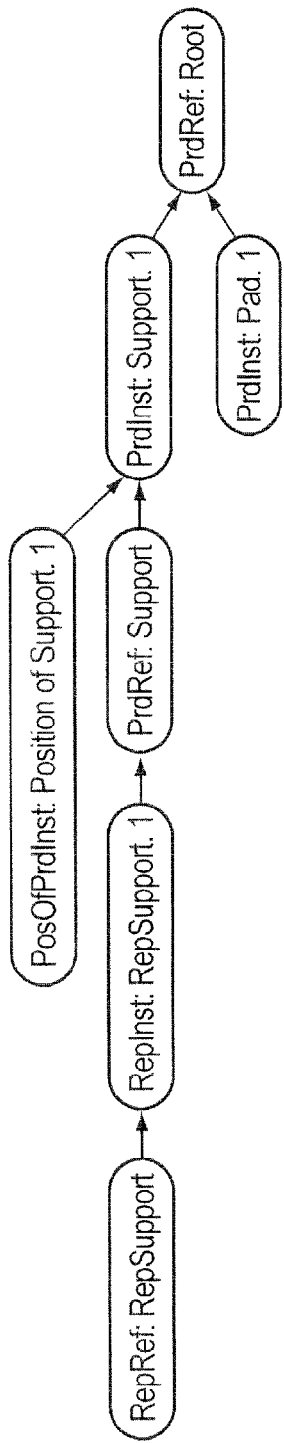
Figure 16F:
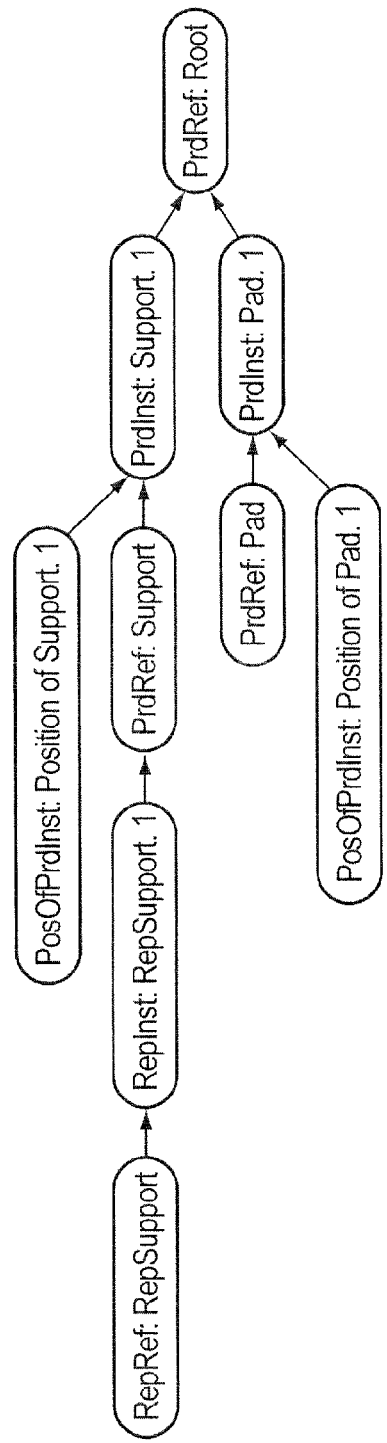
Figure 16G:
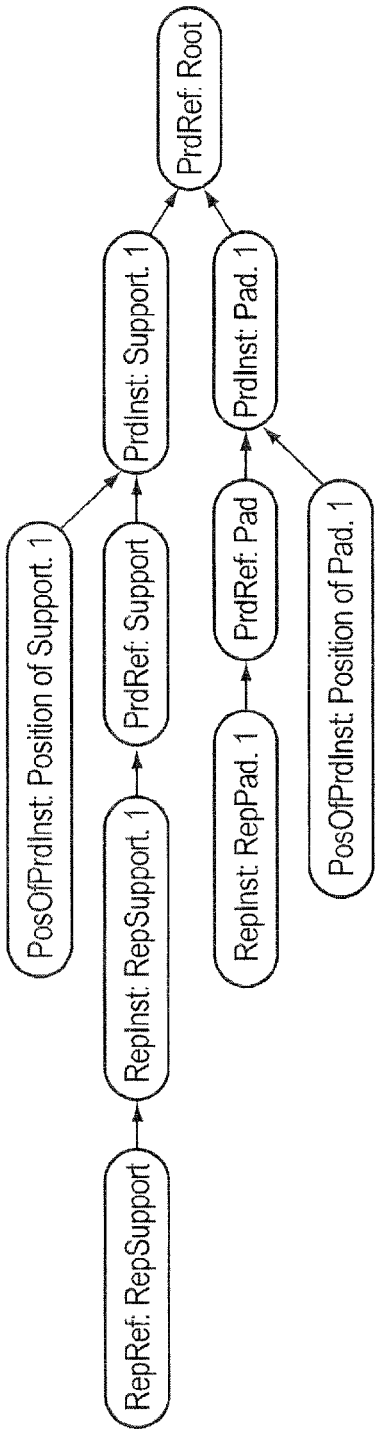
Figure 16H:
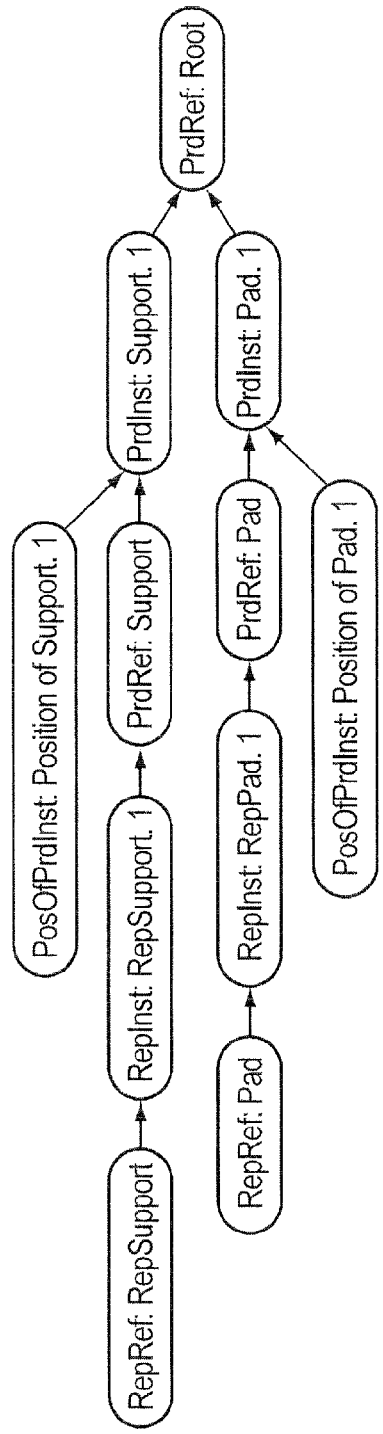

In FIG. 16F, the product instance related to the pad has declared a dependence on both a corresponding reference and a position object. The pad reference later declares an instance of representation, FIG. 16G, which itself declares a corresponding reference, FIG. 16H.

Figure 16I:
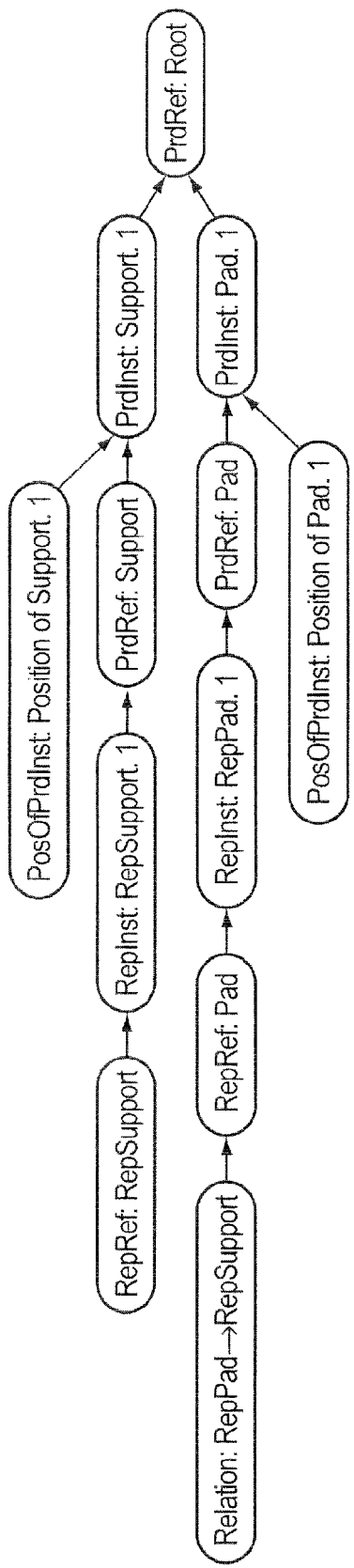

Eventually, FIG. 16I, the reference pertaining to the representation of the pad declares dependence on the critical relation, discussed in reference to FIGS. 14 and 15, since the relation at issue is here considered as an object to be updated.

Figure 16J:
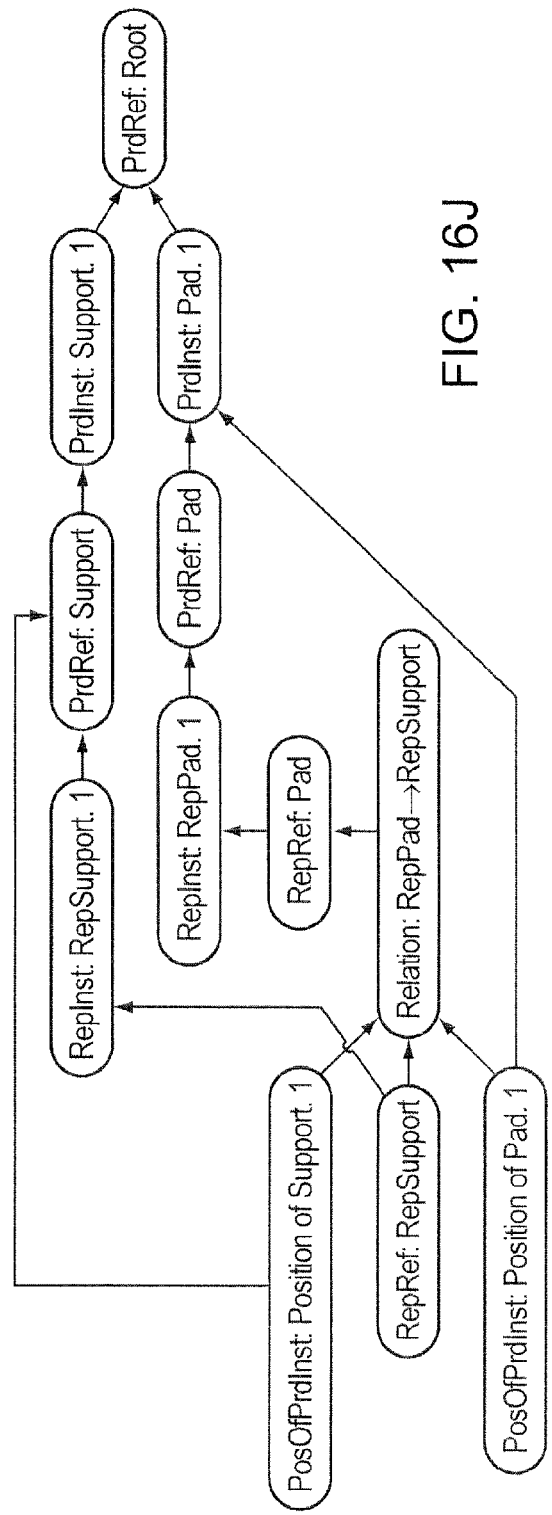

In FIG. 16J, the PLM relation declares depending on Position of support.1, Position of Pad.1 and RepSupport Representation Reference.

The loop ends, as no more elements have to be inserted. All actors (objects) involved in the update process are the nodes of the graph. Note that the relation finally identified is here stored as an object per se, whereas dependencies (dependence relation) between objects are reflected by the arcs of the graph. This illustrates the fact that the dependency between two objects does not necessarily correspond to a relation such as a "CATIA relation".

Furthermore, dependence relations used here are representative of a direct dependence between actors, as obtained from relations involved in the "relational view", i.e., objects pointed by IN dependence relations can be declared as IN dependencies in terms of Update. The relations at stake can hence inform whether pointed-to objects are "in session" or not.

Next, complex nodes are aggregated, and nodes are ranked along directions defined by the arcs in the graph, so as to obtain a ranking list to be used for the update sequence.

Figure 17:
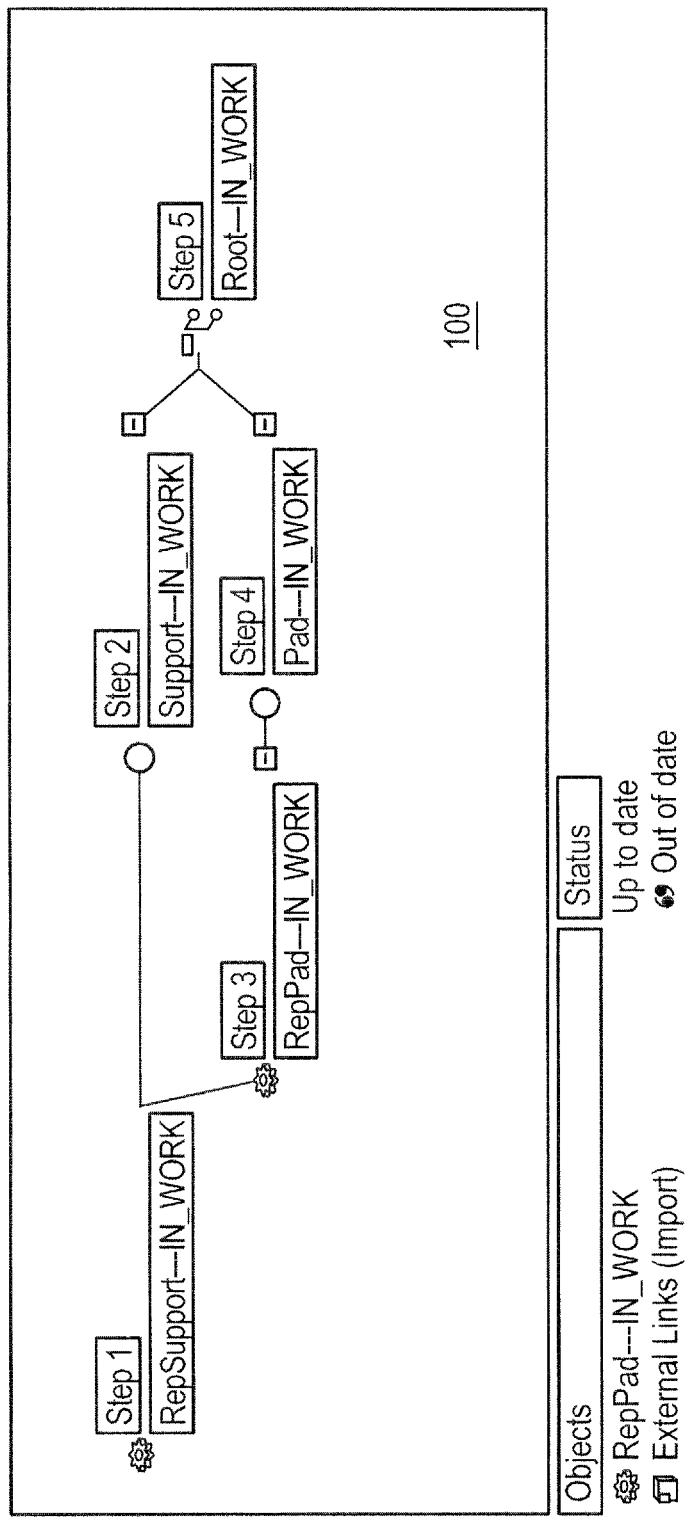
FIG. 17 is a screenshot of an update graph as displayed to a user, during an update session, as in an embodiment of the invention.

Finally, an embodiment further concern a graphical user interface (GUI) 100 as shown in FIG. 17. The GUI communicates with the PLM system so as to display the built graph, e.g., in a dedicated window. Preferably, a status of update of objects is displayed so as to inform the user step-by-step of the update being carried out.

As aggregated nodes are represented, the user can very well grasp the current status of the update. In the example of FIG. 17, the user is informed that the update is currently in work for the representation of the pad of FIGS. 14 and 15. In particular, notice the highlight of 'RepPad---IN_WORK', denoting a given complex node aggregated around a node (a representation of the pad) meaningful to the user. Note that a cluster to update is considered as a "step" of update in FIG. 17, it being understood that the step in question is not directly related to the step of a method in the appended claims.

It is furthermore to be understood that the process described above can be applied to any object in any configuration capable of being defined by a CAD/CAM/CAE system, or any system used to display views of an object from varying viewpoints. Embodiments may be implemented in digital electronic circuitry, or in computer hardware, firmware, software, or in combinations thereof Apparatus of embodiments may be implemented in a computer program product tangibly embodied in a machine-readable storage device for execution by a programmable processor; and method steps of embodiments may be performed by a programmable processor executing a program of instructions to perform functions of embodiments by operating on input data and generating output.

Embodiments may advantageously be implemented in one or more computer programs that are executable on a system including e.g. at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed ASICs (application-specific integrated circuits).

Figure 18:
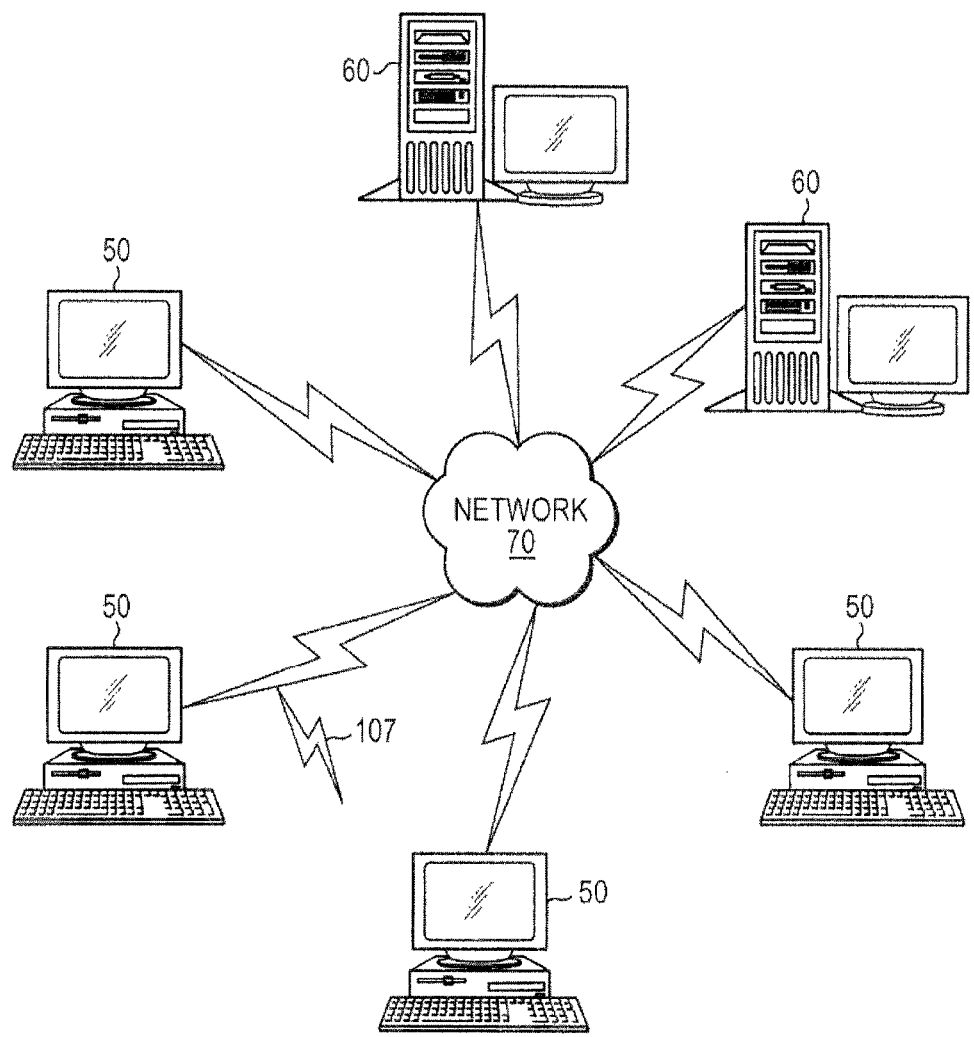
FIG. 18 illustrates a computer network or similar digital processing environment in which the present invention may be implemented.

FIG. 18 illustrates a computer network or similar digital processing environment in which the present invention may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 19:
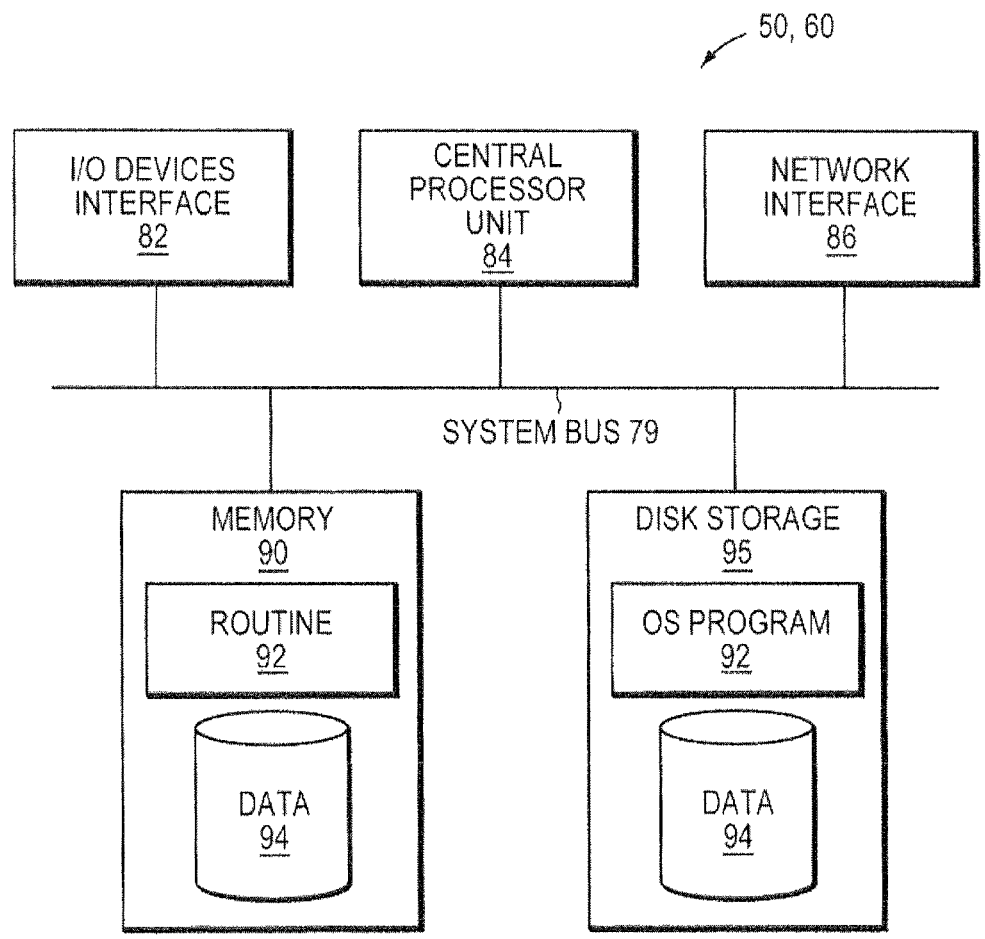
FIG. 19 is a diagram of the internal structure of a computer (e.g., client processor/device 50 or server computers 60) in the computer system of FIG. 18.

FIG. 19 is a diagram of the internal structure of a computer (e.g., client processor/device 50 or server computers 60) in the computer system of FIG. 18. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 18). Memory 90 provides volatile storage for computer software instructions 92 and data 94 used to implement embodiments (e.g., code for the nodes and update algorithms described above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Embodiments may be implemented in a variety of computer architectures.

While embodiments of the invention have been particularly shown and described with references to example embodiments thereof, it will be understood by those skilled in the art that various changes in form and details may be made therein without departing from the scope of the invention encompassed by the appended claims.

What is claimed is:

1. A method of updating object data with respect to object specifications in a product life cycle management (PLM) system that includes objects, dependence relations between objects and object specifications, the method comprising:
   in a hardware processor:
   building a directed graph that includes nodes and arcs, wherein:
      nodes of the graph represent respective objects of the PLM system; and
      a first arc of the graph is directed from a second node to a first node, the first node represents a first object of the PLM system and the second node represents a second object of the PLM system, the first object depending on properties of the second object according to a dependence relation of the PLM system, the first object having object data; and
   updating, in the PLM system, the object data of at least the first object based on changed object data of the second object and object specifications of the PLM system by browsing the graph according to a direction of the first arc.

2. The method of claim 1, wherein building the directed graph comprises:
   identifying the first object of the PLM system to be updated;
   identifying a first particular dependence relation of the PLM system pointing from the first object to the second object;
   storing, in a graph structure definition, the first object and the second object as the respective first node and second node of the graph; and
   storing, in a graph structure definition, the first particular dependence relation of the PLM system as the first arc directed from the second node to the first node.

3. The method of claim 2, wherein building the directed graph further comprises, after identifying the second object:
   identifying a second particular dependence relation in the PLM system pointing from the second object to a third object;
   identifying the third object;
   storing, in the graph structure definition, the third object as a respective third node of the graph; and
   storing, in the graph structure definition, the second particular dependence relation pointing to the third node as a second arc directed from the third node to the second node.

4. The method of claim 1, wherein the dependence relation pointing from the first object to the second object of the PLM system implies a direct dependence of the first object on the second object.

5. The method of claim 2, wherein the first particular dependence relation pointing from the first object to the second object of the PLM system implies a direct dependence of the first object on the second object.

6. The method of claim 1, further comprising:
identifying a cycle in the graph;
aggregating nodes in the identified cycle, if any, as a single complex node; and
substituting the nodes in the identified cycle with the complex node.

7. The method of claim 6, further comprising:
ranking nodes in the graph according to a importance criterion, the importance criterion based on importance for the user; and
aggregating nodes of dissimilar importance according to a proximity criterion.

8. The method of claim 1, further including:
identifying in the graph a redundant arc that directly links two nodes that are further indirectly linked by two or more other arcs of the graph; and
removing the identified redundant arc.

9. The method of claim 1, wherein a particular dependence relation includes information as to whether an object pointed by the relation is in session or not.

10. The method of claim 1, wherein updating object data of at least the first object further comprises ranking nodes of the graph along directions of arcs in the graph, such that the rank of a node is an increment of a largest rank of ancestries of the node in the graph.

11. The method of claim 10, wherein updating object data of at least the first object further comprises re-ranking globally all the nodes of the graph according to a "leaves first" criterion or a "bottom-up" criterion.

12. The method of claim 1, wherein updating object data of at least the first object further comprises browsing the graph and updating each node between the second object and the first object in the browsing direction.

13. The method of claim 12, further comprising displaying nodes and arcs of the graph in a Graphical User Interface prior to and/or during said updating object data.

14. The method of claim 13, wherein displaying nodes and arcs further comprises displaying a status of nodes of the graph according to a status of update thereof, the status being based on the object data.

15. The method of claim 1, wherein the objects of the PLM system include one or more of the following objects: an object of position of a product instance or a product reference, a relation, a network of engineering connections.

16. The method of claim 1, wherein dependence relations include data as to whether a pointed object is in a current working session or not.

17. A computer program product for updating object data with respect to object specifications in a product life cycle management PLM system that includes objects, the computer program product comprising a non-transitory computer usable medium having computer readable code embodied therein, the computer readable code comprising instructions to be executed by one or more processors comprising the steps of:
building a directed graph that includes nodes and arcs, wherein:
each node of the graph represents a respective object of the PLM system; and
a first arc of the graph is directed from a second node to a first node, the first node representing a first object of the PLM system and the second node representing a second object of the PLM system, the first object depending on properties of the second object according to a dependence relation of the PLM system, the first object having object data; and
updating the object data of at least the first object based on object data of the second object and object specifications of the PLM system by browsing the graph according to a direction of the first arc.

18. A computer comprising:
a processor operatively coupled to a data storage system, the data storage system storing objects for use by a product life cycle management (PLM) system; and
a memory operatively coupled to said processor and comprising instructions to configure said processor to:
build a directed graph that includes nodes and arcs, wherein:
each node of the graph represents a respective object of the PLM system; and
a first arc of the graph is directed from a second node to a first node, the first node representing a first object of the PLM system and the second node representing a second object of the PLM system, the first object depending on properties of the second object according to a dependence relation of the PLM system, the first object having object data; and
update the object data of at least the first object based on object data of the second object and object specifications of the PLM system by browsing the graph according to a direction of the first arc.

19. A product life cycle management (PLM) system for use in updating object data with respect to object specifications, said PLM system comprising at least one computer comprising:
a memory configured to store objects, dependence relations between objects and object specifications; and
a processor operatively coupled to said memory and configured to:
build a directed graph comprising nodes and arcs, wherein:
each node of the graph represents a respective object of said PLM system; and
a first arc of the graph is directed from a second node to a first node, the first node representing a first object of the PLM system and the second node representing a second object of the PLM system, the first object depending on the properties of the second object according to a dependence relation of the PLM system, the first object having object data; and
update the object data of at least the first object based on changed object data of the second object and object specifications of the PLM system and obtained by browsing the graph and updating each node according to a direction of the first arc.

20. The method of claim 3, wherein the first arc and the second arc are included in a single arc between two objects.

* * * * *